(12) United States Patent
Huttenlocher

(10) Patent No.: US 7,677,650 B2
(45) Date of Patent: Mar. 16, 2010

(54) EMBLEM FOR MOTOR VEHICLE

(75) Inventor: Marc Huttenlocher, Nurtingen (DE)

(73) Assignee: Decoma (Germany) GmbH, Sulzbach (DE)

( * ) Notice: Subject to any disclaimer, the term of this patent is extended or adjusted under 35 U.S.C. 154(b) by 570 days.

(21) Appl. No.: 11/408,374

(22) Filed: Apr. 21, 2006

(65) Prior Publication Data

US 2006/0237995 A1 Oct. 26, 2006

(30) Foreign Application Priority Data

Apr. 22, 2005 (DE) ........................ 10 2005 019 685

(51) Int. Cl.
*B60J 9/00* (2006.01)
(52) U.S. Cl. .................................... 296/193.1
(58) Field of Classification Search ................. D12/90, D12/91, 93, 96, 163, 164, 165, 173; 180/68.1, 180/68.6; 296/193.1
See application file for complete search history.

(56) References Cited

U.S. PATENT DOCUMENTS

| | | | | |
|---|---|---|---|---|
| 5,698,276 A | * | 12/1997 | Mirabitur | 428/31 |
| 5,709,453 A | * | 1/1998 | Krent et al. | 362/496 |
| D424,993 S | * | 5/2000 | Farzam | D12/163 |
| 2006/0104074 A1 | * | 5/2006 | Boniface et al. | 180/68.1 |
| 2006/0249968 A1 | * | 11/2006 | Carthern | 296/1.08 |

FOREIGN PATENT DOCUMENTS

| DE | 100 29 411 A 1 | 12/2001 |
|---|---|---|
| DE | 102 57 794 B3 | 8/2004 |

* cited by examiner

*Primary Examiner*—Lori L Lyjak
(74) *Attorney, Agent, or Firm*—Warn Partners, P.C.; Marc Luddy

(57) ABSTRACT

An outer part of a motor vehicle having an element and a carrier part. The emblem and carrier part are formed in one piece with the carrier part. The carrier part can take many forms such as a vehicle grille or decorative trim. The outer part can be formed using a method of injection molding and can have a variety of surface finishes.

13 Claims, 4 Drawing Sheets

US 7,677,650 B2

EMBLEM FOR MOTOR VEHICLE

CROSS-REFERENCE TO RELATED APPLICATIONS

This application claims priority to German Patent Application No. 10 2005 019 685.3 filed on Apr. 22, 2005.

TECHNICAL FIELD

The invention relates to an emblem for a motor vehicle, an outer part of a motor vehicle and a method of manufacturing an emblem for a motor vehicle.

BACKGROUND TO THE INVENTION

Emblems, which typically have raised letters, numerals and/or pictorial elements, are regularly applied to motor vehicles to denote the manufacturer or the type of vehicle and are frequently also referred to as badges and company and trademark insignia.

German utility model G 8813438.5 discloses a molding punch for producing a car emblem, which consists of a rubber-elastic material. It has a contact surface corresponding to the end face of a base member, which has a collar around its outer edge.

German utility model G 9319813.2 describes a car emblem made of plastics which is trapezoidal in shape and is made in two parts with a junction extending parallel to the plane of vision or plane of mounting of the emblem. A partial member forming the visible side is chrome-plated at least on one visible side. Another partial element consists of a colored plastics.

Known emblems are produced as separate components and are attached by various methods, e.g. to the radiator grille or to the radiator cover. What is important is that the emblem should be mounted so as to be clearly visible on the exterior of the car. A disadvantage of this is that such emblems are tricky to fit and can easily be removed by unauthorized people.

SUMMARY OF THE INVENTION

The emblem for a motor car according to the invention is characterized in that it is made in one piece with a carrier component.

The carrier component may be, for example, a radiator grille or a decorative trim.

In a preferred embodiment, a joint is formed in the region of the transition between the emblem and the carrier component. As a result the emblem looks like a separate individual part, similar to the emblems of the prior art.

The emblem may be made of a plastics material or of a metallic material.

The surface of the emblem may be chrome-plated or painted. In addition, by printing or some other finishing method, the emblem can be given an optical appearance corresponding to known emblems which are constructed as separate components.

With the emblem according to the invention, it is no longer necessary to mount it as a separate component on an exterior part of the vehicle, thereby doing away with the work involved in fitting it. There is no longer any need to use additional fixing elements. Moreover, there are considerable savings in terms of transportation, packing and storage. Furthermore, there is a saving in weight and materials.

The outer part of a motor vehicle according to the invention has an element and a carrier part, the emblem being formed in one piece with the carrier part. The carrier component may be, for example, a radiator grille or a decorative trim. The outer part may be made of a plastics material or a metallic material. The emblem and the carrier component may also be made of different materials, but with the outer part as a whole still being made in one piece.

In a preferred embodiment, the outer part is chrome-plated, painted or printed in the region of the emblem or finished by some other finishing methods such as painting or galvanizing, for example, and the surface may be structured, particularly in the region of the emblem.

The method of producing an emblem for a motor vehicle according to the invention envisages that the emblem is formed in one piece with a carrier component. The emblem or the outer part described may be produced by injection molding, preferably two-component injection molding. In the two-component injection molding process, the two different components may be injected into a mold simultaneously or one after the other. During the subsequent mold release step provision may have to be made for the molding to be removed from the mold in different directions, e.g. by the use of one or more pushing devices. The surface of the emblem may be chrome-plated. However, it is also possible for a final surface treatment such as painting, galvanizing or surface structuring to be carried out.

As the emblem according to the invention is formed in one piece with the associated carrier component, considerable costs can be saved in storage, assembly, transportation, packaging and fixing materials, such as screws and sleeves. In addition, a separate mounting step is dispensed with. A particular advantage over the known methods is that it is much more difficult to steal an emblem manufactured according to the invention.

Further features and embodiments of the invention will be apparent from the description and the accompanying drawings.

It will be understood that the features mentioned hereinbefore and those to be explained hereinafter may be used not only in the particular combination specified but in other combinations or on their own without departing from the scope of the present invention.

BRIEF DESCRIPTION OF THE INVENTION

The invention is diagrammatically represented by an embodiment in the drawings and is described in detail hereinafter with reference to the drawings.

DETAILED DESCRIPTION OF THE PREFERRED EMBODIMENTS

Figure 1:
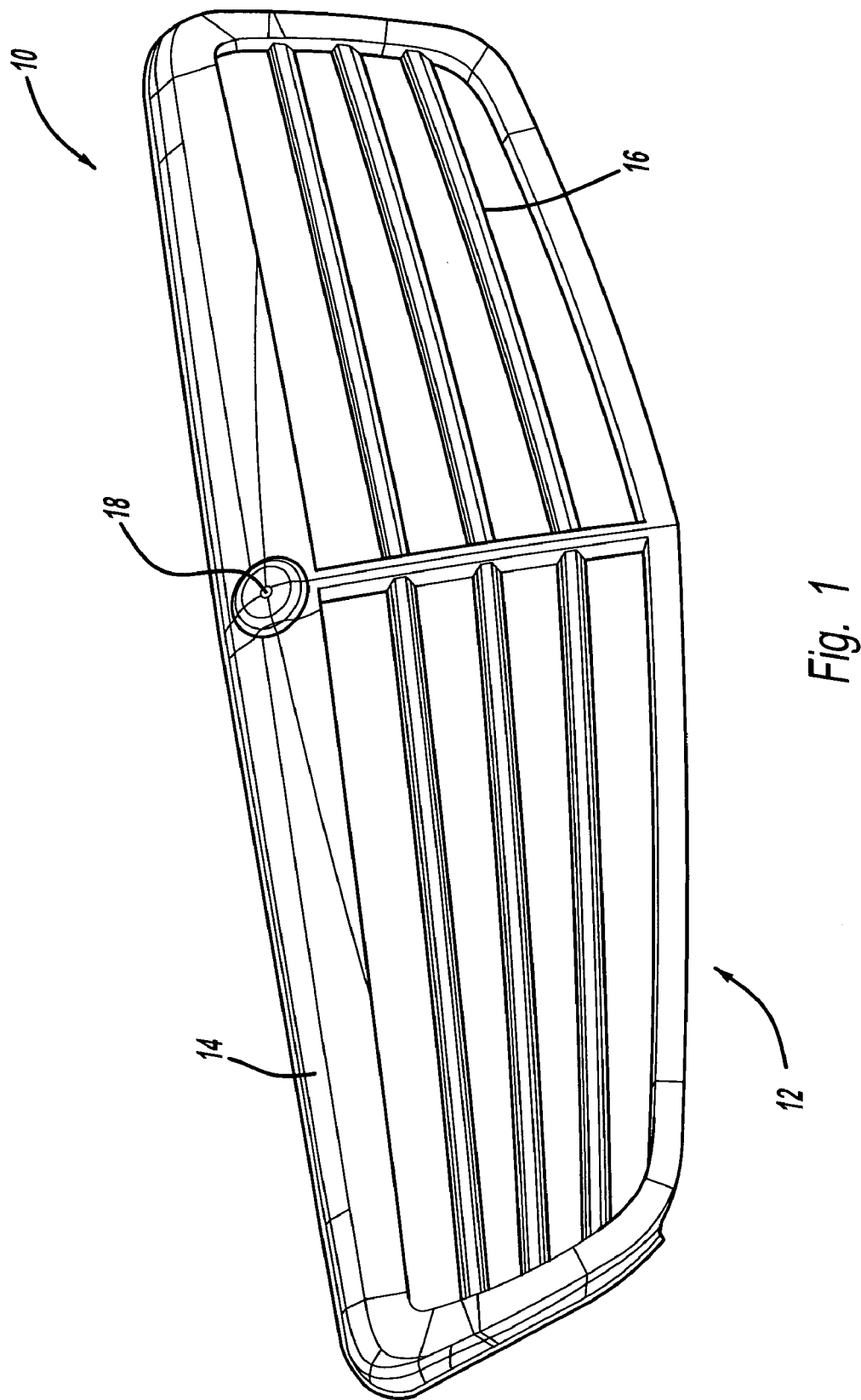
FIG. 1 shows a perspective view of an outer part according to the invention.

FIG. 1 shows a perspective view of a preferred embodiment of the outer part according to the invention, generally designated by reference numeral 10. This outer part 10 comprises a carrier component, in this case a radiator grille 12, which is to be mounted on a vehicle (not shown).

The radiator grille 12 has a frame 14 and struts 16 contained within this frame 14. In the middle of the upper part of the radiator grille 12 is provided an emblem portion 18 which is formed in one piece with the radiator grille 12.

The outer part 10 shown may be produced by injection molding, for example. Different materials may be used by injecting different materials in a two or more component injection process. Thus, for example, the emblem 18 may be made from a different material from the radiator grille 12 and still be formed in one piece therewith. In a final step the complete outer part 10 may be painted. However, it is also possible for the surface of the outer part 10 to be chrome-plated or otherwise treated in the region of the emblem 18.

Figure 2:
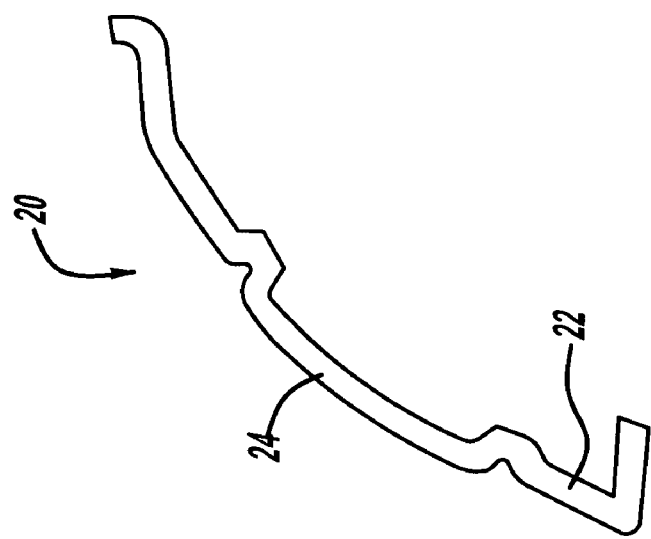
FIG. 2 is a sectional side view of the outer part according to the invention from FIG. 1 compared with an outer part according to the prior art.
Figure 2:
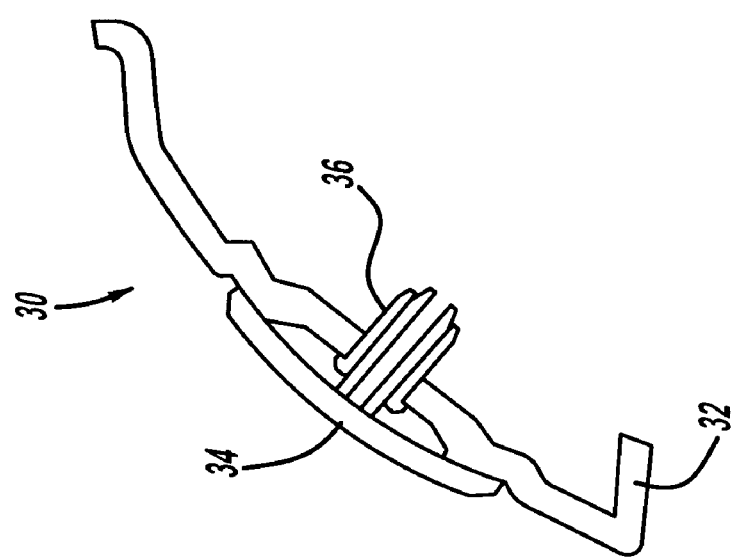

FIG. 2 is a sectional view of the embodiment of the outer part according to the invention, which is designated 20 in this figure. The outer part 20 comprises the carrier component 22 and the emblem 24, which are formed in one piece. An outer part 30 according to the prior art is shown as a comparison. This also comprises a carrier component 32 and an emblem 34, which is constructed as a separate component. It can be seen that the emblem 34 shown is connected to the carrier component 32 by fixing elements 36. Compared with the outer part 20 according to the invention as illustrated, this represents additional work in the assembly of the vehicle.

Figure 3:
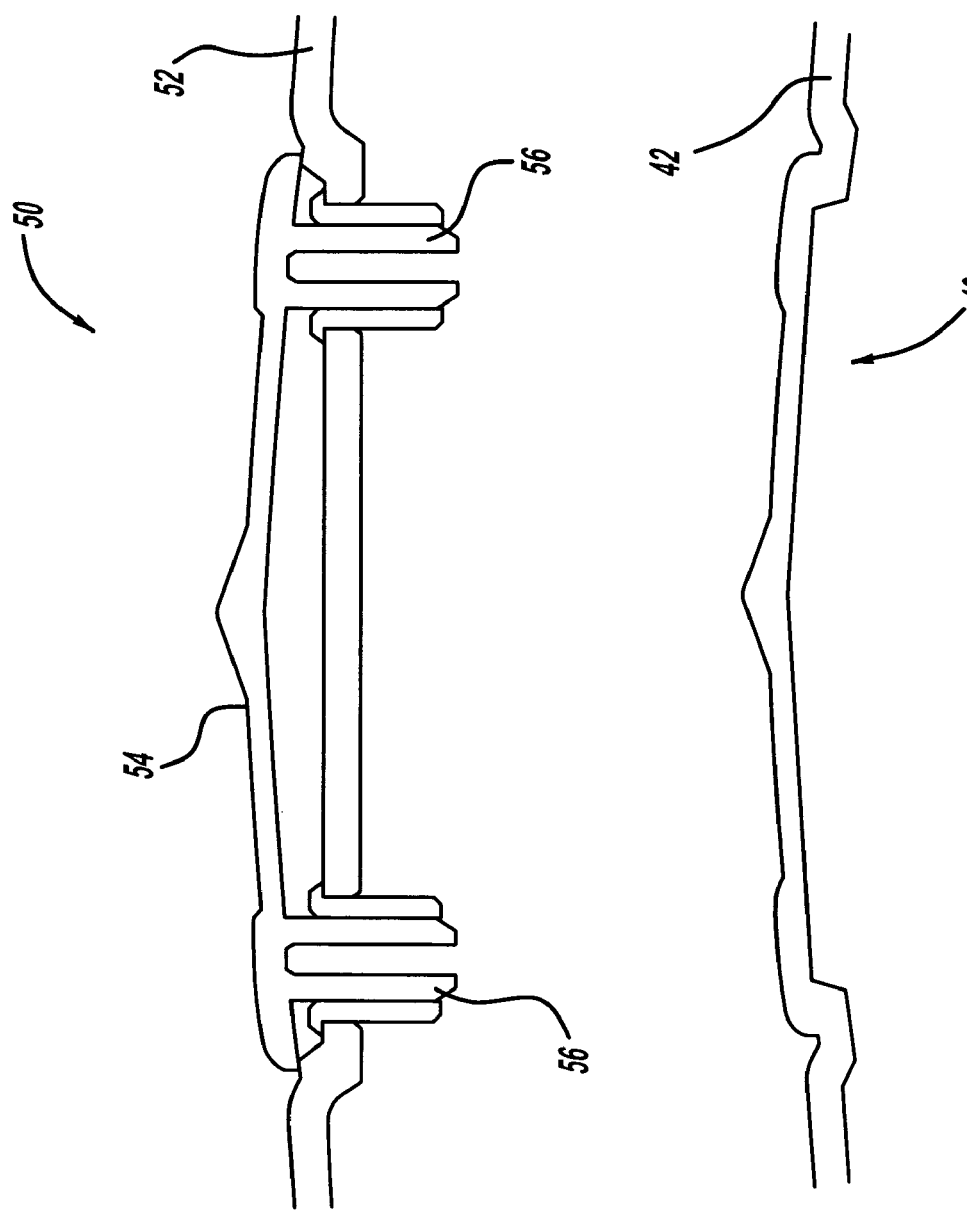
FIG. 3 shows in another sectional side view the embodiment of the outer part according to the invention from FIG. 1 by comparison with an outer part according to the prior art.

FIG. 3 shows the preferred embodiment of the outer part according to the invention, in another sectional view, and bearing reference numeral 40 in this view. The Figure clearly shows that the outer part 40 according to the invention, comprising the carrier component 42 and the emblem 44, is made in one piece.

By comparison, an outer part 50 according to the prior art is shown, which also comprises a carrier component 52 and an emblem 54. Once again, it is clear that additional fixing means 56 are required at two points in order to provide a connection between the carrier component 52 and the emblem 54.

Figure 4:
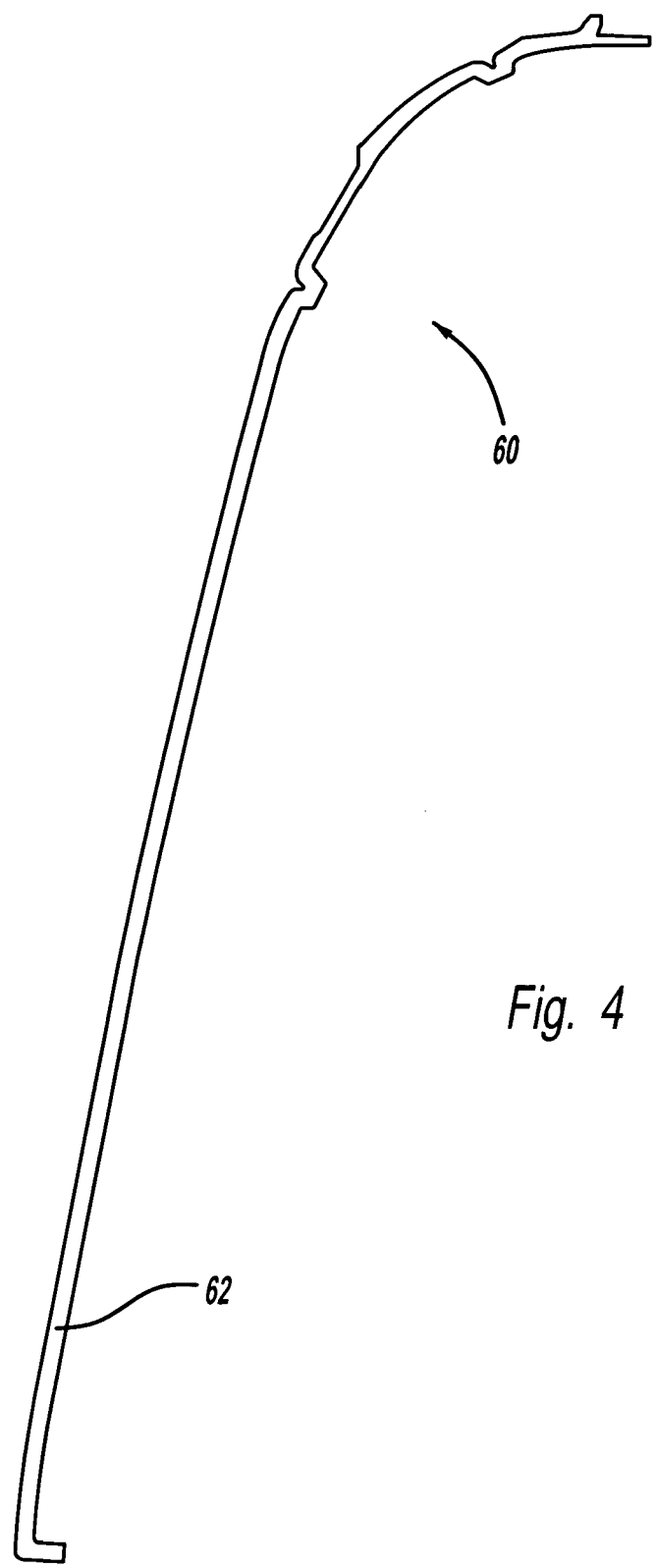
FIG. 4 shows in another sectional side view the embodiment of the outer part according to the invention from FIG. 1.

FIG. 4 shows the outer part 60 according to the invention, in section, in another sectional view. This again shows how the outer part 60 comprises the carrier component 62 and the emblem 64 as an integral component.

The embodiment shown uses a radiator grille as the carrier component. However, it is possible to use any desired outer part such as a decorative trim, for example.

When shaping the outer part one factor to be noted is whether certain parts have to be back-molded as in this case the mold must allow the finished part to be removed in two or more directions.

What is claimed is:

1. An outer part for a motor vehicle comprising:
   a carrier component;
   an emblem formed integrally on the carrier component; and a joint formed in the region of a transition between the emblem and the carrier component.

2. The outer part of claim 1, wherein said carrier component is a vehicle grille.

3. The outer part of claim 1, wherein said carrier component is a decorative trim.

4. The outer part of claim 1, wherein the surface of said emblem is chrome-plated.

5. The outer part of claim 1, wherein the surface of said emblem is painted.

6. The outer part of claim 1, wherein said emblem is made of a plastics material.

7. The outer part of claim 1, wherein said emblem is made of a metallic material.

8. An outer part of a motor vehicle comprising:
   an emblem; and
   a carrier component, wherein the emblem is formed in one piece with the carrier component.

9. The outer part according to claim 8, wherein said carrier component is a radiator grille.

10. The outer part according to claim 8, wherein the carrier component is a decorative trim.

11. The outer part according to claim 8, wherein said outer part is made of a plastics material.

12. The outer part according to claim 8, wherein said outer part is made of a metallic material.

13. The outer part according to claim 8, wherein said outer part is chrome-plated.

* * * * *